US010480662B2

(12) United States Patent
Futahashi et al.

(10) Patent No.: US 10,480,662 B2
(45) Date of Patent: Nov. 19, 2019

(54) STEAM VALVE AND STEAM TURBINE SYSTEM

(71) Applicant: Mitsubishi Hitachi Power Systems, Ltd., Kanagawa (JP)

(72) Inventors: Kensuke Futahashi, Tokyo (JP); Hiroyuki Kanazawa, Tokyo (JP); Kengo Imaoka, Tokyo (JP); Katsuhisa Hamada, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 4 days.

(21) Appl. No.: 15/770,372

(22) PCT Filed: Oct. 21, 2016

(86) PCT No.: PCT/JP2016/081218
§ 371 (c)(1),
(2) Date: Apr. 23, 2018

(87) PCT Pub. No.: WO2017/073466
PCT Pub. Date: May 4, 2017

(65) Prior Publication Data
US 2018/0252320 A1 Sep. 6, 2018

(30) Foreign Application Priority Data

Oct. 30, 2015 (JP) ................................ 2015-213769

(51) Int. Cl.
*F16K 1/44* (2006.01)
*F01D 17/10* (2006.01)
(Continued)

(52) U.S. Cl.
CPC ............. *F16K 1/443* (2013.01); *F01D 17/10* (2013.01); *F01D 25/00* (2013.01); *F16K 1/44* (2013.01);
(Continued)

(58) Field of Classification Search
CPC .............................................. Y10T 137/87917
(Continued)

(56) References Cited

U.S. PATENT DOCUMENTS 966,797 A * 8/1910 Conrader ................ F16K 1/443
   137/614.21
3,529,630 A * 9/1970 Podolsky .................. F16K 1/44
   137/630.13
(Continued)

FOREIGN PATENT DOCUMENTS

JP        2008-175267        7/2008
KR        10-0978850         8/2010
(Continued)

OTHER PUBLICATIONS

International Search Report dated Jan. 10, 2017 in International (PCT) Application No. PCT/JP2016/081218.
(Continued)

*Primary Examiner* — John Fox
(74) *Attorney, Agent, or Firm* — Wenderoth, Lind & Ponack, L.L.P.

(57) ABSTRACT

A steam valve includes a valve casing, a first valve body having a first cylindrical part and a first end wall part, a second valve body having a second cylindrical part and a second end wall part, a first valve stem capable of vertically biasing the first valve body, a second valve stem capable of vertically biasing the second valve body, a flow guide disposed inside the first cylindrical part and having a projection configured to project downwardly from the first cylindrical part and the second cylindrical part when the first cylindrical part and the second cylindrical part are apart from the valve seat, and a support supporting the flow guide. The support extends from the valve casing or the second valve body to the flow guide through a through hole formed
(Continued)

in the first valve body to support the flow guide such that the flow guide is tiltable.

8 Claims, 6 Drawing Sheets

(51) Int. Cl.
    *F01D 25/00*     (2006.01)
    *F16K 47/02*     (2006.01)

(52) U.S. Cl.
    CPC .......... *F16K 47/02* (2013.01); *F05D 2220/31* (2013.01); *Y10T 137/87917* (2015.04)

(58) Field of Classification Search
    USPC ........ 137/614.17–614.18, 637; 251/210–211
    See application file for complete search history.

(56) References Cited

U.S. PATENT DOCUMENTS

| | | | |
|---|---|---|---|
| 4,092,214 A * | 5/1978 | Schabert | F16K 17/168 137/599.16 |
| 4,500,070 A * | 2/1985 | Riollet | F16K 47/04 251/282 |
| 9,650,910 B2 * | 5/2017 | Futahashi | F01D 17/10 |
| 2012/0137688 A1 * | 6/2012 | Batwal | F01D 17/145 60/660 |
| 2015/0322812 A1 | 11/2015 | Futahashi et al. | |
| 2016/0169030 A1 * | 6/2016 | Kahl | F16K 1/443 251/63 |

FOREIGN PATENT DOCUMENTS

| | | |
|---|---|---|
| KR | 2015-0073213 | 6/2015 |
| WO | 2014/098073 | 6/2014 |

OTHER PUBLICATIONS

Korean Office Action dated Jun. 28, 2019 in corresponding Korean Application No. 10-2018-7011401 with Machine Translation.

\* cited by examiner

STEAM VALVE AND STEAM TURBINE SYSTEM

TECHNICAL FIELD

The present disclosure relates to a steam valve and a steam turbine system.

BACKGROUND ART

In a steam supply channel to a steam turbine, a steam governing valve capable of adjusting the supply amount of steam and a steam stop valve capable of stopping the supply of steam are disposed.

For instance, a steam valve device disclosed in Patent Document 1 can be used as the steam governing valve. This steam valve device has a valve body and a flow guide disposed in a recess of the valve body. The valve body, the flow guide, and other component define a steam passage at fully or nearly fully opening degree. This configuration reduces the change in flow passage area of the steam passage at fully or nearly fully opening degree and prevents steam from swirling near the recess, thus suppressing the pressure loss.

On the other hand, a steam valve disclosed in Patent Document 2 includes a stop valve body and a governing valve body, so that a single valve has two functions as the steam stop valve and the steam governing valve. Thus, the use of the steam valve disclosed in Patent Document 2 reduces the pressure loss, compared with the case where the steam stop valve and the steam governing valve are separately prepared.

CITATION LIST

Patent Literature

Patent Document 1: JP2008-175267A
Patent Document 2: WO2014/098073A

SUMMARY

Problems to be Solved

Although the steam valve device disclosed in Patent Document 1 can be used as the steam governing valve, this steam valve device requires an additional steam stop valve for the application in a steam turbine. When the steam governing valve and the steam stop valve are separately prepared, the respective valves cause the pressure loss, thus increasing the pressure loss.

In contrast, the use of the steam valve disclosed in Patent Document 2 reduces the pressure loss, compared with the case where the steam stop valve and the steam governing valve are separately prepared.

However, the steam valve disclosed in Patent Document 2 does not has a flow guide which is included in the steam valve device disclosed in the Patent Document 1. Consequently, the use of the steam valve disclosed in Patent Document 2 increases the change in flow passage area of the steam passage at fully valve opening degree, thus causing the pressure loss. Moreover, when the valve opening degree is small, steam can swirl, and vibration can occur.

In view of the above circumstances, an object of at least one embodiment of the present invention is to provide a steam valve capable of reducing the pressure loss and suppressing the vibration at a small valve opening degree with a simple configuration, and a steam turbine system including the steam valve.

Solution to the Problems (1) A steam valve according at least one embodiment of the present invention comprises a valve casing including: a valve chamber; an inlet flow passage opening to the valve chamber; an outlet flow passage opening to the valve chamber; and a valve seat surrounding an opening of the outlet flow passage; a first valve body accommodated in the valve chamber, the first valve body including: a first cylindrical part having a first end vertically abuttable on the valve seat; and a first end wall part formed integrally with a second end side of the first cylindrical part; a second valve body accommodated in the valve chamber, the second valve body including: a second cylindrical part coaxially disposed with respect to the first cylindrical part and having a first end vertically abuttable on the valve seat at an outer position than the first cylindrical part; and a second end wall part formed integrally with a second end side of the second cylindrical part; a first valve stem capable of vertically biasing the first valve body; a second valve stem capable of vertically biasing the second valve body; a flow guide disposed inside the first cylindrical part, the flow guide having a projection configured to project downwardly from the first cylindrical part and the second cylindrical part when the first cylindrical part and the second cylindrical part are apart from the valve seat; and a support which supports the flow guide, the support extending from the valve casing or the second valve body to the flow guide through a through hole formed in the first valve body to support the flow guide such that the flow guide is tiltable with respect to the valve casing or the second valve body.

With the above configuration (1), the steam valve includes the first valve body and the second valve body, so that the steam valve has two functions as the steam stop valve and the steam governing valve. Thus, the use of this steam valve reduces the pressure loss, compared with the case where the steam stop valve and the steam governing valve are separately prepared.

Additionally, with the above configuration (1), the steam valve includes the flow guide, and thereby it is possible to reduce the pressure loss at a large valve opening degree.

Furthermore, the above configuration (1), in which the steam valve includes the flow guide, prevents steam from swirling at a small valve opening degree, thus preventing the occurrence of vibration of the first valve body and the second valve body.

On the other hand, with the above configuration (1), the support extends to the flow guide through a through hole formed in the first valve body, and thereby the flow guide is supported with a simple configuration.

Meanwhile, when the second valve body has a large valve opening degree, the second valve body can tilt. In this case, if the flow guide is supported by the second valve body via the support, the flow guide is likely to interrupt the operation of the first valve body. In this regard, the above configuration (1) with the tiltable flow guide with respect to the valve casing or the second valve body prevents the flow guide from interrupting the operation of the first valve body.

(2) In some embodiments, in the above configuration (1), the support has rigidity allowing the flow guide to tilt with respect to the valve casing or the second valve body.

With the above configuration (2), the support has rigidity allowing the flow guide to tilt, and thus the flow guide is prevented from interrupting the operation of the first valve body with a simple configuration.

(3) In some embodiments, in the above configuration (1), the flow guide has a spherical seat allowing the flow guide to tilt with respect to the second valve body.

With the above configuration (3), the flow guide has a spherical seat allowing the flow guide to tilt, and thus the flow guide is prevented from interrupting the operation of the first valve body with a simple configuration.

(4) In some embodiments, in any one of the above configurations (1) to (3), the support comprises at least one rod penetrating the first cylindrical part in a radial direction of the first cylindrical part and extending between the second cylindrical part and the flow guide.

With the above configuration (4), the support includes a rod penetrating the first cylindrical part, and thus it is possible to support the flow guide with a simple configuration.

(5) In some embodiments, in any one of the above configurations (1) to (3), the support comprises at least one rod penetrating the first end wall part and vertically extending between the second end wall part and the flow guide.

With the above configuration (5), the support includes a rod penetrating the first end wall part, and thus it is possible to support the flow guide with a simple configuration.

(6) In some embodiments, in any one of the above configurations (1) to (3), the steam valve further comprises a plurality of vanes each mounted to the valve casing and arranged around the valve seat, wherein at least one of the plurality of vanes forms a part of the support, and the support extends between the valve casing and the flow guide via the at least one vane.

With the above configuration (6), the support includes at least one vane, and thus it is possible to support the flow guide with a simple configuration while preventing the support from interrupting a flow of steam.

(7) In some embodiments, in any one of the above configurations (1) to (6), the steam valve further comprises a second-valve-body pressure equalization mechanism capable of connecting an upper space surrounded by the second cylindrical part between the first end wall part and the second end wall part to a space outside the second cylindrical part; and a first-valve-body pressure equalization mechanism capable of connecting a lower space surrounded by the first cylindrical part between the first end wall part and the projection to the upper space, wherein the flow guide has a pressure equalization hole penetrating the projection and connecting the outlet flow passage to the lower space.

With the above configuration (7), the first-valve-body pressure equalization mechanism and the pressure equalization hole balance an upward pressure and a downward pressure applied to the first valve body. Thus, it is possible to operate the first valve body by a small biasing force.

Additionally, with the above configuration (7), the second-valve-body pressure equalization mechanism balances an upward pressure and a downward pressure applied to the second valve body. Thus, it is possible to operate the second valve body by a small biasing force.

(8) A steam turbine system according at least one embodiment of the present invention comprises the steam valve according to any one of the above configurations (1) to (7); and a steam turbine configured to be supplied with steam from the steam valve.

With the above configuration (8), steam is supplied to the steam turbine from the steam valve according to any one of the above configurations (1) to (7), and thus it is possible to reduce the pressure loss in the whole steam turbine system and prevent the vibration caused when the steam valve has a small valve opening degree.

Advantageous Effects

According at least one embodiment of the present invention, there is provided a steam valve capable of reducing the pressure loss and suppressing the vibration at a small valve opening degree with a simple configuration, and a steam turbine system including the steam valve.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

For instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
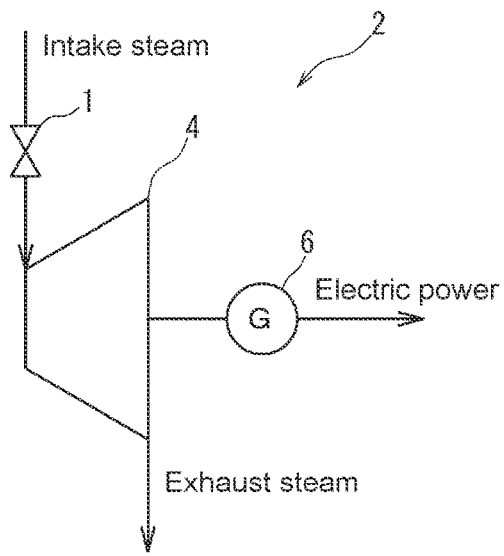
FIG. 1 is a diagram showing a schematic configuration of a steam turbine system using a steam valve according to an embodiment of the present invention.

FIG. 1 shows a schematic configuration of a steam turbine system 2 using a steam valve 1 according to an embodiment of the present invention.

The steam turbine system 2 includes the steam valve 1 and a steam turbine 4 to which steam (intake steam) is supplied from the steam valve 1. The steam turbine 4 can convert energy of the supplied steam to output power. The steam (exhaust steam) from which energy has been taken is discharged from the steam turbine 4. For instance, the power output from the steam turbine 4 is transmitted to a generator 6, and the generator 6 generates electric power by utilizing the power.

Figure 2:
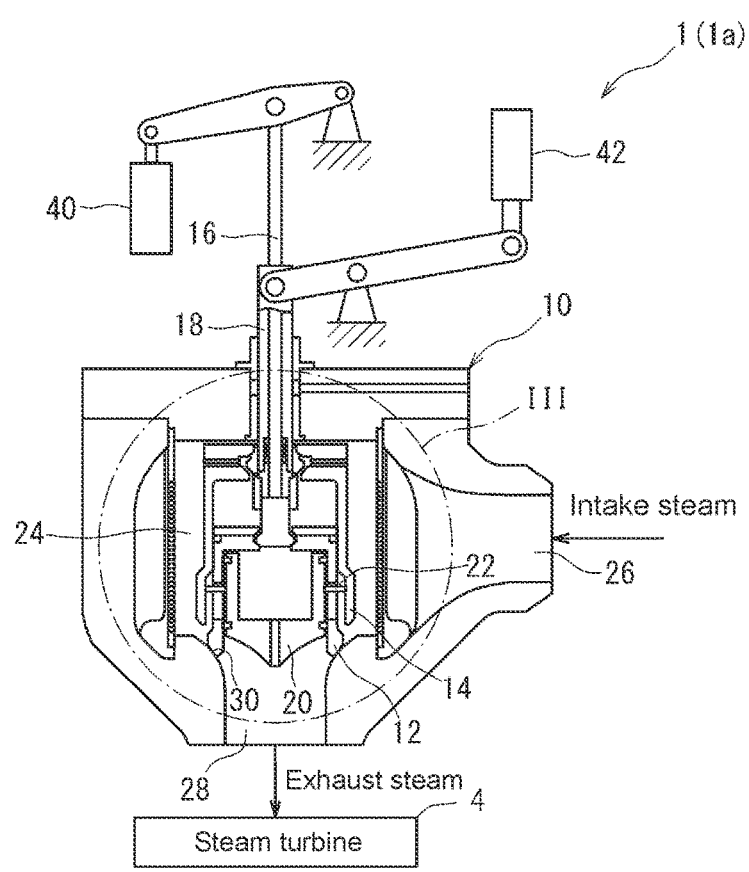
FIG. 2 is a schematic cross-sectional view showing a partial configuration of a steam valve according to an embodiment of the present invention.
Figure 3:
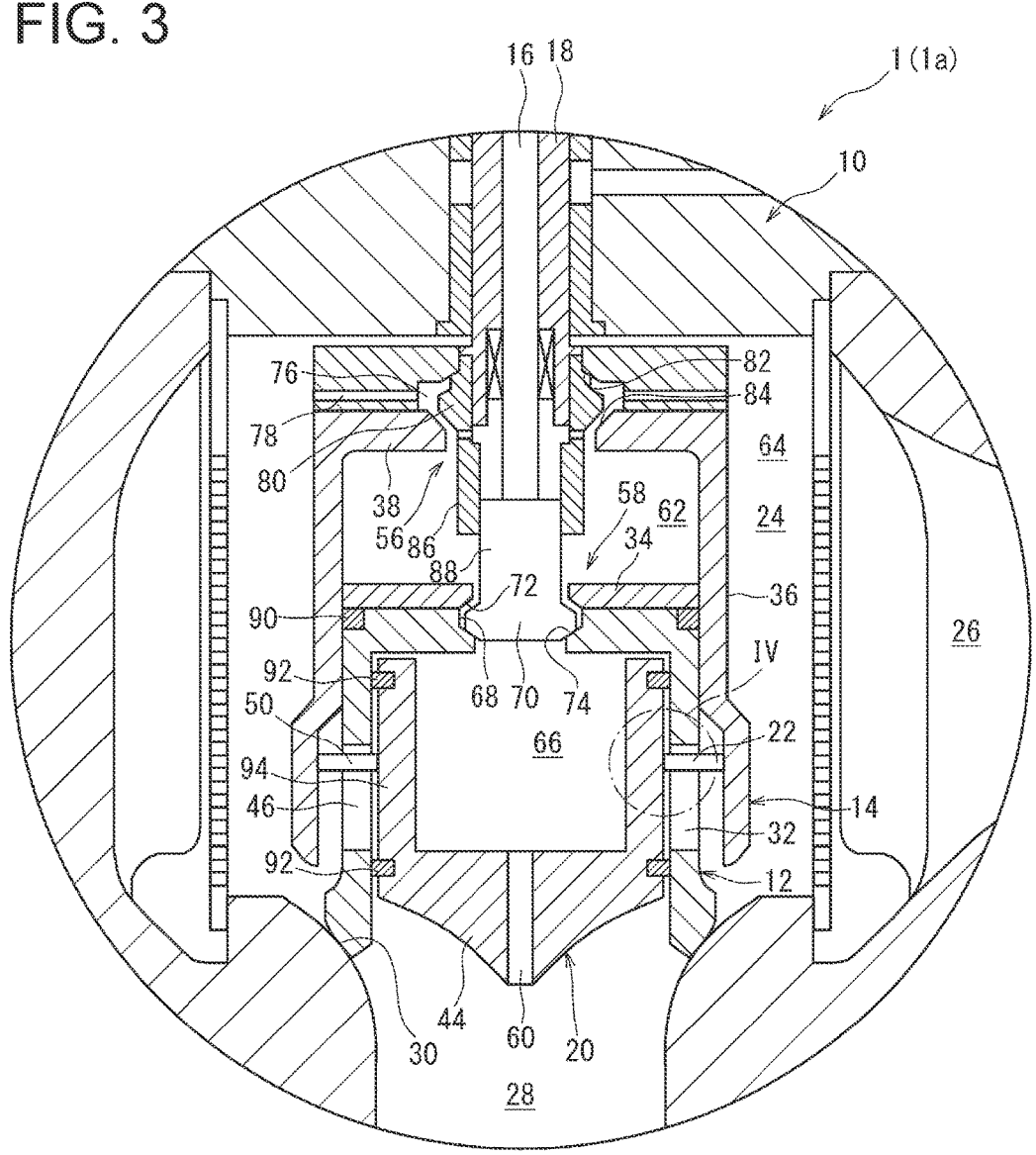
FIG. 3 is an enlarged cross-sectional view schematically showing region III in FIG. 2.
Figure 4:
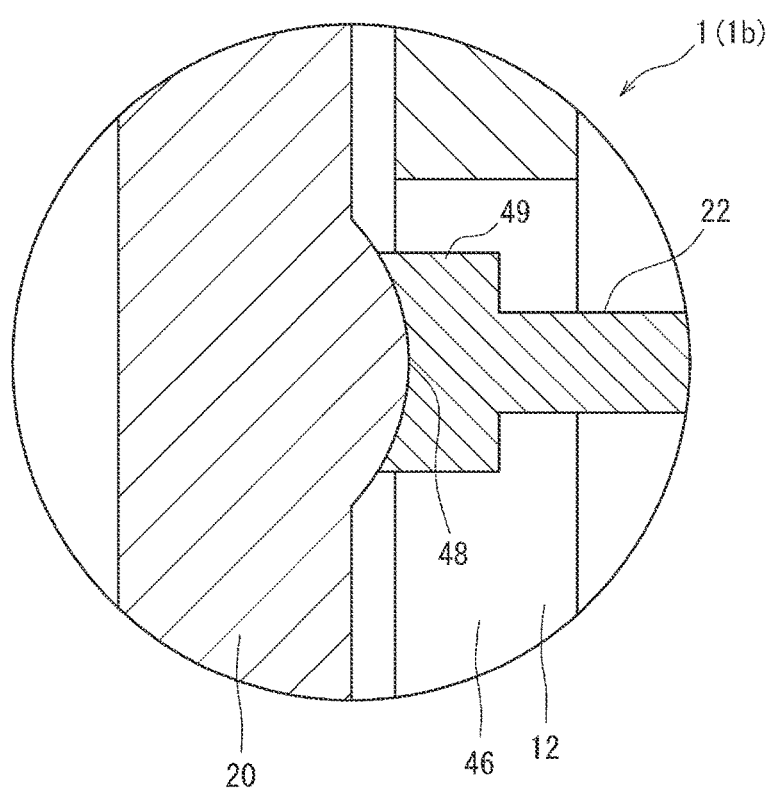
FIG. 4 is an enlarged cross-sectional view of a region, corresponding to region IV in FIG. 3, of a steam valve according to another embodiment.
Figure 5:
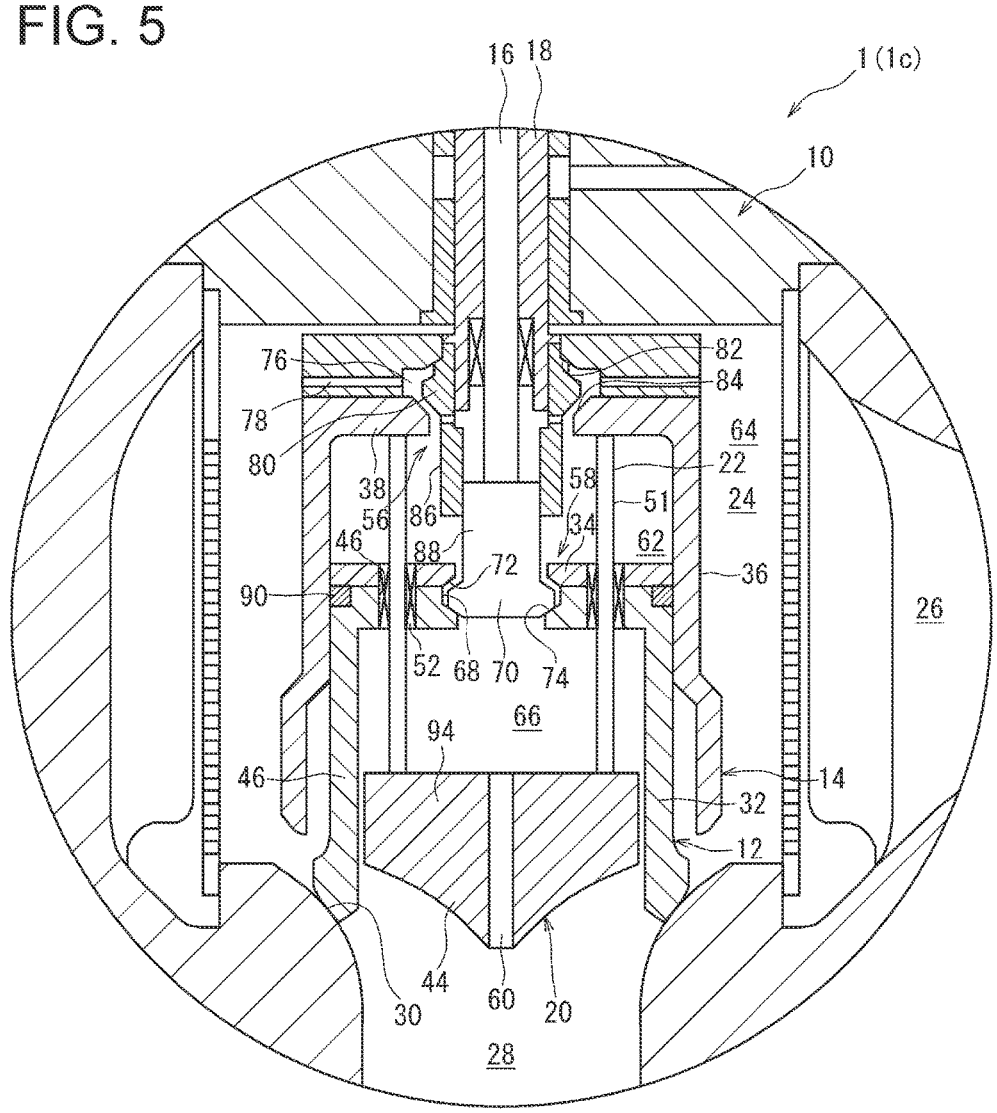
FIG. 5 is an enlarged cross-sectional view of a region, corresponding to region III in FIG. 2, of a steam valve according to another embodiment.
Figure 6:
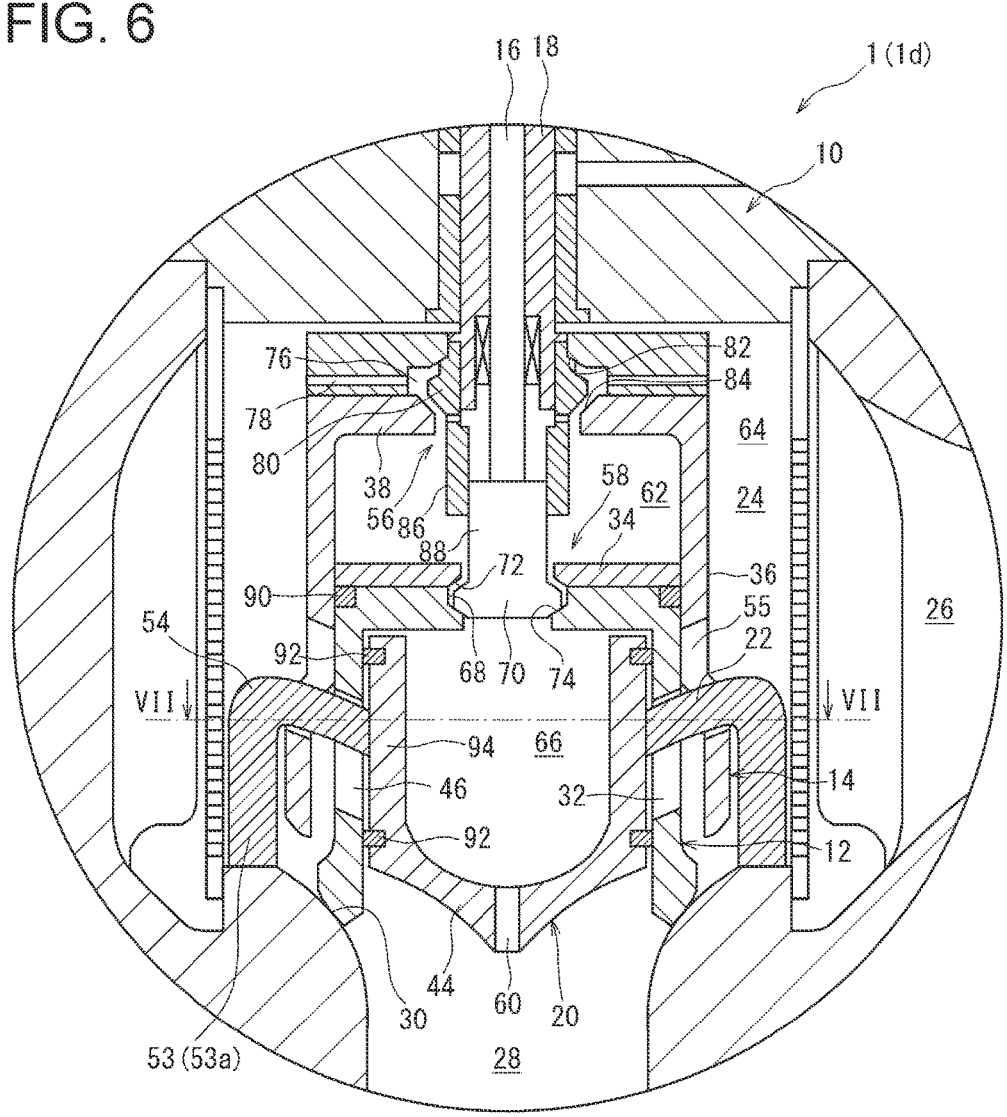
FIG. 6 is an enlarged cross-sectional view of a region, corresponding to region III in FIG. 2, of a steam valve according to another embodiment.
Figure 7:
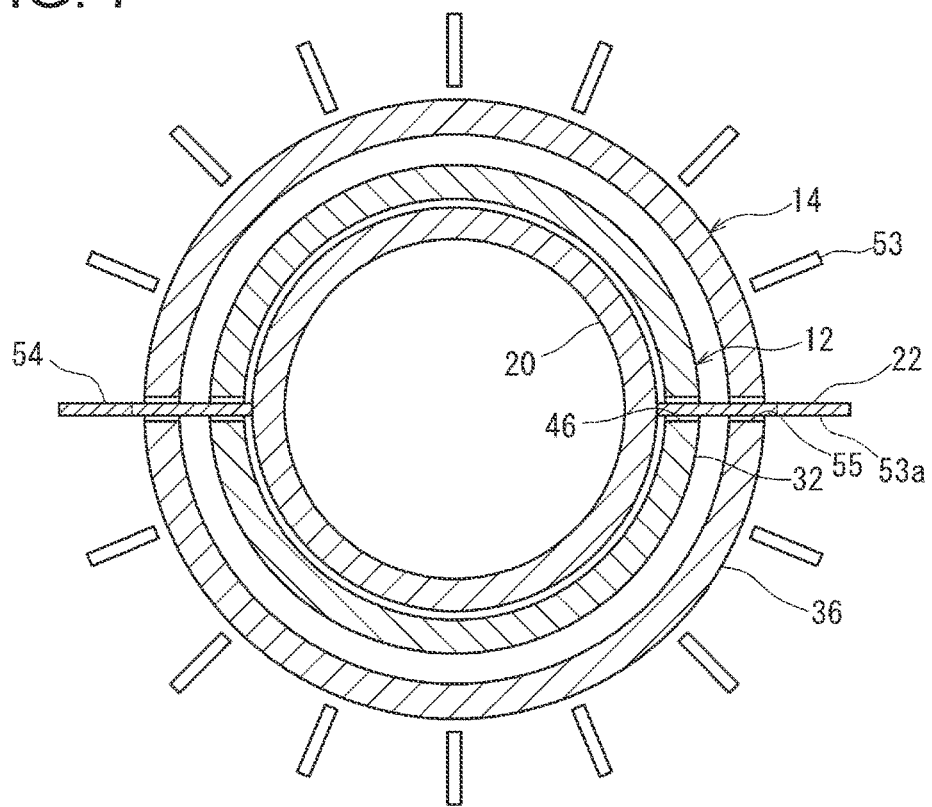
FIG. 7 is a schematic cross-sectional view showing a flow guide, a first valve body, a second valve body, and a support with vanes, taken along line VII-VII in FIG. 6.

FIG. 2 is a schematic cross-sectional view showing a partial configuration of a steam valve 1 (1a) according to an embodiment of the present invention. FIG. 3 is an enlarged view schematically showing region III in FIG. 2. FIG. 4 is an enlarged cross-sectional view of a region, corresponding to region IV in FIG. 3, of a steam valve 1 (1b) according to another embodiment. FIG. 5 is an enlarged cross-sectional view of a region, corresponding to region III in FIG. 2, of a steam valve 1 (1c) according to another embodiment. FIG. 6 is an enlarged cross-sectional view of a region, corresponding to region III in FIG. 2, of a steam valve 1 (1d) according to another embodiment. FIG. 7 is a schematic cross-sectional view showing a flow guide, a first valve body, a second valve body, and a support with vanes, taken along line VII-VII in FIG. 6.

As shown in FIGS. 2 and 3, the steam valve 1 (1a) includes a valve casing 10, a first valve body 12, a second valve body 14, a first valve stem 16, a second valve stem 18, a flow guide 20, and a support 22.

The valve casing 10 has a valve chamber 24 defined inside the valve casing 10, an inlet flow passage 26 opening to the valve chamber 24, an outlet flow passage (valve hole) 28 opening to the valve chamber 24, and a valve seat 30 surrounding an opening of the outlet flow passage 28. For instance, the outlet flow passage 28 vertically extends, and the valve seat 30 has a trumpet-like shape with a gradually upwardly increasing opening area.

The first valve body 12 is accommodated in the valve chamber 24. The first valve body 12 includes a first cylindrical part 32 having a first end vertically abuttable on the valve seat 30, and a first end wall part 34 formed integrally with a second end of the first cylindrical part 32.

The second valve body 14 is also accommodated in the valve chamber 24 and has a second cylindrical part 36 and a second end wall part 38. The second cylindrical part 36 is coaxially disposed with respect to the first cylindrical part 32 and has a first end vertically abuttable on the valve seat 30 more radially outside than the first cylindrical part 32. The second end wall part 38 is formed integrally with a second end of the second cylindrical part 36.

The first valve stem 16 can vertically bias the first valve body 12. Being biased by the first valve stem 16, the first valve body 12 can vertically come into and out of contact with the valve seat 30.

For instance, the first valve stem 16 air-tightly penetrates an upper portion of the valve casing 10 and extends from the first end wall part 34 to the outside of the valve casing 10. A first actuator 40 is connected to an outer end of the first valve stem 16, and the first valve stem 16 can bias the first valve body 12 by driving force of the first actuator 40. For instance, the first actuator 40 can be constituted of a hydraulic cylinder or the like.

The second valve stem 18 can vertically bias the second valve body 14. Being biased by the second valve stem 18, the second valve body 14 can vertically come into and out of contact with the valve seat 30.

For instance, the second valve stem 18 air-tightly penetrates an upper portion of the valve casing 10 and extends from the second end wall part 38 to the outside of the valve casing 10. A second actuator 42 is connected to an outer end of the second valve stem 18, and the second valve stem 18 can bias the second valve body 14 by driving force of the second actuator 42. For instance, the second actuator 42 can be constituted of a hydraulic cylinder or the like.

Further, for instance, the second valve stem 18 has a hollow cylindrical shape, and the first valve stem 16 air-tightly penetrates and extends inside the second valve stem 18.

The flow guide 20 is disposed inside the first cylindrical part 32 and has a projection 44 configured to project downwardly from the first cylindrical part 32 and the second cylindrical part 36 when the first cylindrical part 32 and the second cylindrical part 36 are apart from the valve seat 30. The projection 44 is shaped so that the change in flow passage area is made small at a junction between the valve chamber 24 and the outlet flow passage 28 when the first valve body 12 and the second valve body 14 are apart from the valve seat 30. For instance, the projection 44 is sharpened downwardly.

The support 22 supports the flow guide 20. The support 22 extends from the valve casing 10 or the second valve body 14 to the flow guide 20 through a through hole 46 formed in the first valve body 12.

With the above configuration, the steam valve includes the first valve body 12 and the second valve body 14, so that the steam valve 1 has two functions as the steam stop valve and the steam governing valve. Thus, the use of the steam valve 1 reduces the pressure loss, compared with the case where the steam stop valve and the steam governing valve are separately prepared.

Additionally, with the above configuration, the steam valve 1 includes the flow guide 20, and thereby it is possible to reduce the pressure loss when the first valve body 12 and the second valve body 14 have a large valve opening degree.

Furthermore, the above configuration, in which the steam valve 1 includes the flow guide 20, prevents steam from swirling when the first valve body 12 or the second valve body 14 has a small valve opening degree, thus preventing the occurrence of vibration of the first valve body 12 and the second valve body 14.

On the other hand, with the above configuration, the support 22 extends to the flow guide 20 through a through hole 46 formed in the first valve body 12, and thereby the flow guide 20 is supported with a simple configuration.

Additionally, the above configuration causes steam to be supplied to the steam turbine 4 from the steam valve 1, and thereby reduces the pressure loss in the whole steam turbine system 2 and prevents the vibration caused when the steam valve 1 has a small valve opening degree.

In the above configuration, either the first valve body 12 or the second valve body 14 may be used as the stopping valve, and either valve body may be used as the governing valve. For instance, the first valve body 12 may be used as the stopping valve whereas the second valve body 14 may be used as the governing valve.

In some embodiments, the support 22 supports the flow guide 20 such that the flow guide 20 is tiltable with respect to the valve casing 10 or the second valve body 14.

When the second valve body 14 has a large valve opening degree, the second valve body 14 can tilt. In this case, if the flow guide 20 is supported by the second valve body 14 via the support 22, the flow guide 20 is likely to interrupt the operation of the first valve body 12. In this regard, the above configuration with the tiltable flow guide 20 with respect to the valve casing 10 or the second valve body 14 prevents the flow guide 20 from interrupting the operation of the first valve body 12.

In some embodiments, the support 22 has rigidity allowing the flow guide 20 to tilt with respect to the valve casing 10 or the second valve body 14.

With the above configuration, the support 22 has rigidity allowing the flow guide 20 to tilt, and thus the flow guide 20 is prevented from interrupting the operation of the first valve body 12 with a simple configuration.

In some embodiments, as shown in FIG. 4, the flow guide 20 has a spherical seat 48 allowing the flow guide 20 to tilt with respect to the second valve body 14.

With the above configuration, the flow guide 20 has a spherical seat 48 allowing the flow guide 20 to tilt, and thus the flow guide 20 is prevented from interrupting the operation of the first valve body 12 with a simple configuration.

In this case, the support 22 includes an engagement portion 49 having a concave surface which is slidable with respect to the spherical seat 48.

In some embodiments, as shown in FIG. 3, the support 22 includes a rod 50 penetrating the first cylindrical part 32 in a radial direction of the first cylindrical part 32 and extending between the second cylindrical part 36 and the flow guide 20.

With the above configuration, the support 22 includes a rod 50 penetrating the first cylindrical part 32, and the flow guide 20 is supported by the rod 50. Thus, it is possible to support the flow guide 20 with a simple configuration. In this case, the through hole 46 is formed in the first cylindrical part 32 and has a vertically long hole shape to allow a relative displacement of the first cylindrical part 32 relative to the support 22.

The number of the rod 50 is not limited to particular values. The plurality of rods 50 are radially arranged. Each rod 50 may be fixed by welding, bolts, or the like.

In some embodiments, as shown in FIG. 5, the support 22 includes at least one rod 51 penetrating the first end wall part 34 and vertically extending between the second end wall part 38 and the flow guide 20. In this case, the through hole 46 vertically penetrates the first end wall part 34, and a sealing member 52 is disposed between the through hole 46 and the rod 51.

With the above configuration, the support 22 includes at least one rod 51 penetrating the first end wall part 34, and the flow guide 20 is supported by the rod 51. Thus, it is possible to support the flow guide 20 with a simple configuration.

The number of the rod 51 is not limited to particular values. The plurality of rods 51 are arranged in a circumferential direction of the first cylindrical part 32. Each rod 51 may be fixed by welding, bolts, or the like.

In some embodiments, as shown in FIGS. 6 and 7, the steam valve 1 (1d) includes a plurality of vanes 53. The plurality of vanes 53 are each mounted to the valve casing 10 and arranged around the valve seat 30.

Further, at least one vane 53a of the vanes 53 forms a part of the support 22, and the support 22 extends between the valve casing 10 and the flow guide 20 via the at least one vane 53a.

With the above configuration, the support 22 includes at least one vane 53a, and thus, it is possible to support the flow guide 20 with a simple configuration while preventing the support 22 from interrupting a flow of steam.

In this case, the support 22 is shaped so that the flow is not interrupted. For instance, the support 22 is composed of an L-shaped plate 54. The plate 54 penetrates and extends through a through hole 46 provided in the first cylindrical part 32 and a through hole 55 provided in the second cylindrical part 36. For instance, the through hole 46 is shaped into a vertically long hole so as to allow a relative displacement of the first cylindrical part 32 relative to the support 22. The through hole 55 is similarly shaped into a vertically long hole so as to allow a relative displacement of the second cylindrical part 36 relative to the support 22.

In some embodiments, as shown in FIGS. 3, 5, and 6, the steam valve 1 (1a, 1c, 1d) includes a second-valve-body pressure equalization mechanism 56 and a first-valve-body pressure equalization mechanism 58, and the flow guide 20 has a pressure equalization hole 60.

The second-valve-body pressure equalization mechanism 56 can connect an upper space 62 surrounded by the second cylindrical part 36 between the first end wall part 34 and the second end wall part 38 to a space 64 inside the valve chamber 24 and outside the second cylindrical part 36. The second-valve-body pressure equalization mechanism 56 can interrupt the communication between the upper space 62 and the space 64 as needed.

The first-valve-body pressure equalization mechanism 58 can connect a lower space 66 surrounded by the first cylindrical part 32 between the first end wall part 34 and the projection 44 to the upper space 62. The first-valve-body pressure equalization mechanism 58 can interrupt the communication between the lower space 66 and the upper space 62 as needed.

The pressure equalization hole 60 penetrates the projection 44 of the flow guide 20 and connects the outlet flow passage 28 and the lower space 66. The pressure equalization hole 60 always connects the outlet flow passage 28 and the lower space 66. The number and the location of the pressure equalization hole 60 are not particularly limited.

With the above configuration, the first-valve-body pressure equalization mechanism 58 and the pressure equalization hole 60 balance an upward pressure and a downward pressure applied to the first valve body 12. Thus, it is possible to operate the first valve body 12 by a small biasing force. Consequently, a downsized first actuator 40 can be used.

Additionally, with the above configuration, the second-valve-body pressure equalization mechanism 56 balances an upward pressure and a downward pressure applied to the second valve body 14. Thus, it is possible to operate the second valve body 14 by a small biasing force. Consequently, a downsized second actuator 42 can be used.

In some embodiments, as shown in FIGS. 3, 5, and 6, the first-valve-body pressure equalization mechanism 58 includes a first pressure equalization axial hole 68, a first pressure equalization valve body 70, a first pressure equalization upper valve seat 72, and a first pressure equalization lower valve seat 74.

The first pressure equalization axial hole 68 vertically penetrates a middle portion of the first end wall part 34.

The first pressure equalization valve body 70 is mounted to a lower end of the first valve stem 16 and disposed inside the first pressure equalization axial hole 68 in a vertically movable manner.

The first pressure equalization upper valve seat 72 is provided around an upper opening of the first pressure equalization axial hole 68, and the first pressure equalization valve body 70 can abut on the first pressure equalization upper valve seat 72 through an upward movement.

The first pressure equalization lower valve seat 74 is provided around a lower opening of the first pressure equalization axial hole 68, and the first pressure equalization valve body 70 can air-tightly abut on the first pressure equalization lower valve seat 74 through a downward movement.

In addition, when the first pressure equalization valve body 70 is apart from the first pressure equalization lower valve seat 74, the lower space 66 communicates with the upper space 62.

In some embodiments, as shown in FIGS. 3, 5, and 6, the second-valve-body pressure equalization mechanism 56 includes a second pressure equalization axial hole 76, a second pressure equalization radial hole 78, a second pressure equalization valve body 80, a second pressure equalization upper valve seat 82, and a second pressure equalization lower valve seat 84.

The second pressure equalization axial hole 76 vertically penetrates a middle portion of the second end wall part 38. The second pressure equalization radial hole radially extends inside the second end wall part 38 and extends between the second pressure equalization axial hole 76 and an outer peripheral surface of the second end wall part 38.

The second pressure equalization valve body 80 is mounted to a lower end of the second valve stem 18 and disposed inside the second pressure equalization axial hole 76 in a vertically movable manner.

The second pressure equalization upper valve seat 82 is provided around an upper opening of the second pressure equalization axial hole 76, and the second pressure equalization valve body 80 can air-tightly abut on the second pressure equalization upper valve seat 82 through an upward movement.

The second pressure equalization lower valve seat 84 is provided around a lower opening of the second pressure equalization axial hole 76, and the second pressure equalization valve body 80 can air-tightly abut on the second pressure equalization lower valve seat 84 through a downward movement.

In addition, when the second pressure equalization valve body 80 is apart from the second pressure equalization lower valve seat 84, the upper space 62 communicates with the space 64 inside the valve chamber 24 and outside the second valve body 14 through the second pressure equalization axial hole 76 and the second pressure equalization radial hole 78.

In some embodiments, as shown in FIGS. 3, 5, and 6, a sleeve 86 is provided integrally with the second pressure equalization valve body 80, and a shaft part 88 is provided integrally with the first pressure equalization valve body 70. The sleeve 86 extends downwardly from the second pressure equalization valve body 80. The shaft part 88 extends upwardly from the first pressure equalization valve body 70. Further, an upper end portion of the shaft part 88 is slidably fitted to a lower end portion of the sleeve 86.

In some embodiments, as shown in FIGS. 3, 5, and 6, an annular sealing member 90 is disposed between the first cylindrical part 32 or the first end wall part 34 and the second cylindrical part 36. The sealing member 90 limits a flow of steam in a gap between the first cylindrical part 32 and the second cylindrical part 36.

In some embodiments, as shown in FIGS. 3 and 6, at least two annular sealing members 92 are disposed between the first cylindrical part 32 and the flow guide 20. The at least two annular sealing members 92 are vertically arranged above and under the support 22, i.e., above and under the through hole 46 and limit a flow of steam passing through the through hole 46 provided in the first cylindrical part 32 for the support 22.

In some embodiments, as shown in FIGS. 3, 5, and 6, the flow guide 20 includes a cylindrical part 94 formed integrally with the projection 44. The cylindrical part 94 is disposed inside the first cylindrical part 32. The cylindrical part may be hollow or solid.

In some embodiments, as shown in FIGS. 3, 5, and 6, the outer diameter of a lower end portion (sealing portion) of the first cylindrical part 32 is larger than the outer diameter of a middle portion of the first cylindrical part 32, and a lower end portion of the first cylindrical part 32 is thicker than a middle portion of the first cylindrical part 32 or a lower end portion (sealing portion) of the second cylindrical part 36, in a radial direction of the first cylindrical part 32. Further, the second cylindrical part 36 has a stepped cylindrical shape in which a lower end of the second cylindrical part 36 has a larger diameter than an upper end of the second cylindrical part 36, and a gap between a lower end of the first cylindrical part 32 and a lower end of the second cylindrical part 36 is larger than a gap between an upper end of the first cylindrical part 32 and a lower end of the second cylindrical part 36.

Embodiments of the present invention were described in detail above, but the present invention is not limited thereto, and various amendments and modifications may be implemented.

REFERENCE SIGNS LIST

1 (1*a*-1*d*) Steam valve
2 Steam turbine system
4 Steam turbine
6 Generator
10 Valve casing
12 First valve body
14 Second valve body
16 First valve stem
18 Second valve stem
20 Flow guide
22 Support
24 Valve chamber
26 Inlet flow passage
28 Outlet flow passage (Valve hole)
30 Valve seat
32 First cylindrical part
34 First end wall part
36 Second cylindrical part
38 Second end wall part
40 First actuator
42 Second actuator
44 Projection
46 Through hole
48 Spherical seat
49 Engagement portion
50 Rod
51 Rod
52 Sealing member
53, 53*a* Vane
54 Plate
55 Through hole
56 Second-valve-body pressure equalization mechanism
58 First-valve-body pressure equalization mechanism
60 Pressure equalization hole
62 Upper space
64 Space
66 Lower space
68 First pressure equalization axial hole
70 First pressure equalization valve body
72 First pressure equalization upper valve seat 74 First pressure equalization lower valve seat
76 Second pressure equalization axial hole
78 Second pressure equalization radial hole
80 Second pressure equalization valve body
82 Second pressure equalization upper valve seat
84 Second pressure equalization lower valve seat
86 Sleeve
88 Shaft part
90, 92 Sealing member
94 Cylindrical part

The invention claimed is:

1. A steam valve comprising:
a valve casing including: a valve chamber; an inlet flow passage opening to the valve chamber; an outlet flow passage opening to the valve chamber; and a valve seat surrounding an opening of the outlet flow passage;
a first valve body accommodated in the valve chamber, the first valve body including: a first cylindrical part having a first end vertically abuttable on the valve seat; and a first end wall part formed integrally with a second end side of the first cylindrical part;
a second valve body accommodated in the valve chamber, the second valve body including: a second cylindrical part coaxially disposed with respect to the first cylindrical part and having a first end vertically abuttable on the valve seat at an outer position than the first cylindrical part; and a second end wall part formed integrally with a second end side of the second cylindrical part;
a first valve stem capable of vertically biasing the first valve body;
a second valve stem capable of vertically biasing the second valve body;
a flow guide disposed inside the first cylindrical part, the flow guide having a projection configured to project downwardly from the first cylindrical part and the second cylindrical part when the first cylindrical part and the second cylindrical part are apart from the valve seat; and
a support which supports the flow guide,
the support extending from the valve casing or the second valve body to the flow guide through a through hole formed in the first valve body to support the flow guide such that the flow guide is tiltable with respect to the valve casing or the second valve body.

2. The steam valve according to claim 1,
wherein the support has rigidity allowing the flow guide to tilt with respect to the valve casing or the second valve body.

3. The steam valve according to claim 1,
wherein the flow guide has a spherical seat allowing the flow guide to tilt with respect to the second valve body.

4. The steam valve according to claim 1,
wherein the support comprises at least one rod penetrating the first cylindrical part in a radial direction of the first cylindrical part and extending between the second cylindrical part and the flow guide.

5. The steam valve according to claim 1,
wherein the support comprises at least one rod penetrating the first end wall part and vertically extending between the second end wall part and the flow guide.

6. The steam valve according to claim 1, further comprising
a plurality of vanes each mounted to the valve casing and arranged around the valve seat,
wherein at least one of the plurality of vanes forms a part of the support, and
the support extends between the valve casing and the flow guide via the at least one vane.

7. The steam valve according to claim 1, further comprising:
a second-valve-body pressure equalization mechanism capable of connecting an upper space surrounded by the second cylindrical part between the first end wall part and the second end wall part to a space outside the second cylindrical part; and
a first-valve-body pressure equalization mechanism capable of connecting a lower space surrounded by the first cylindrical part between the first end wall part and the projection to the upper space,
wherein the flow guide has a pressure equalization hole penetrating the projection and connecting the outlet flow passage to the lower space.

8. A steam turbine system comprising:
the steam valve according to claim 1; and
a steam turbine configured to be supplied with steam from the steam valve.

* * * * *